US011576221B2

(12) United States Patent
Yang et al.

(10) Patent No.: US 11,576,221 B2
(45) Date of Patent: *Feb. 7, 2023

(54) SYSTEMS AND METHODS FOR NETWORK-ENABLED PEER-TO-PEER COMMUNICATION USING MULTI-ACCESS EDGE COMPUTING

(71) Applicant: Verizon Patent and Licensing Inc., Basking Ridge, NJ (US)

(72) Inventors: Jin Yang, Orinda, CA (US); Donna L. Polehn, Mercer Island, WA (US); Daryl M. Low, San Jose, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 45 days.

This patent is subject to a terminal disclaimer.

(21) Appl. No.: 17/302,979

(22) Filed: May 18, 2021

(65) Prior Publication Data
US 2021/0274579 A1 Sep. 2, 2021

Related U.S. Application Data

(63) Continuation of application No. 16/689,751, filed on Nov. 20, 2019, now Pat. No. 11,026,279.

(51) Int. Cl.
| H04W 76/14 | (2018.01) |
| H04W 12/06 | (2021.01) |
| H04W 4/02 | (2018.01) |
| H04L 9/40 | (2022.01) |
| H04W 12/08 | (2021.01) |

(Continued)

(52) U.S. Cl.
CPC ........ *H04W 76/14* (2018.02); *H04L 63/1416* (2013.01); *H04L 67/51* (2022.05); *H04L 67/52* (2022.05); *H04L 67/561* (2022.05); *H04W 4/023* (2013.01); *H04W 8/24* (2013.01); *H04W 12/06* (2013.01); *H04W 12/08* (2013.01); *H04W 16/22* (2013.01); *H04L 67/00* (2013.01); *H04W 4/40* (2018.02)

(58) Field of Classification Search
CPC ..... H04W 16/22; H04W 12/08; H04W 67/18; H04W 67/2804; H04W 67/00; H04W 63/1416; H04W 8/24
See application file for complete search history.

(56) References Cited

U.S. PATENT DOCUMENTS

2018/0041954 A1* 2/2018 Tamura ................. H04M 15/80
2019/0141142 A1* 5/2019 Filippou ................. H04W 4/40
(Continued)

*Primary Examiner* — Barbara B Anyan

(57) ABSTRACT

A network device may receive multi-access edge computing (MEC) proximity service information that identifies a set of MEC devices and a set of network services supported by respective MEC devices of the set of MEC devices. The network device may transmit, to a base station, at least a portion of the MEC proximity service information for broadcasting by the base station. The network device may receive, from a user device, a request to establish a peer-to-peer connection with a MEC device for the network service. The network device may authenticate the user device for access to the network service. The network device may transmit, to the user device and the MEC device, connection information that enables the user device and the MEC device to establish the peer-to-peer connection, based on authenticating the user device for access to the network service.

20 Claims, 6 Drawing Sheets

(51) Int. Cl.

| | |
|---|---|
| *H04W 8/24* | (2009.01) |
| *H04W 16/22* | (2009.01) |
| *H04L 67/51* | (2022.01) |
| *H04L 67/52* | (2022.01) |
| *H04L 67/561* | (2022.01) |
| *H04W 4/40* | (2018.01) |
| *H04L 67/00* | (2022.01) |

(56) References Cited

U.S. PATENT DOCUMENTS

| | | | | |
|---|---|---|---|---|
| 2019/0141536 | A1* | 5/2019 | Bachmutsky | H04W 12/08 |
| 2019/0335320 | A1* | 10/2019 | Subramaniam | H04W 8/24 |
| 2020/0274887 | A1* | 8/2020 | Zaw | H04L 63/1416 |
| 2020/0274942 | A1* | 8/2020 | Mueck | H04L 67/2804 |
| 2020/0383157 | A1* | 12/2020 | Lee | H04L 67/00 |
| 2020/0389531 | A1* | 12/2020 | Lee | H04L 67/18 |
| 2020/0396644 | A1* | 12/2020 | Matsumoto | H04W 16/22 |
| 2021/0014755 | A1* | 1/2021 | Caceres | H04W 36/0038 |

* cited by examiner

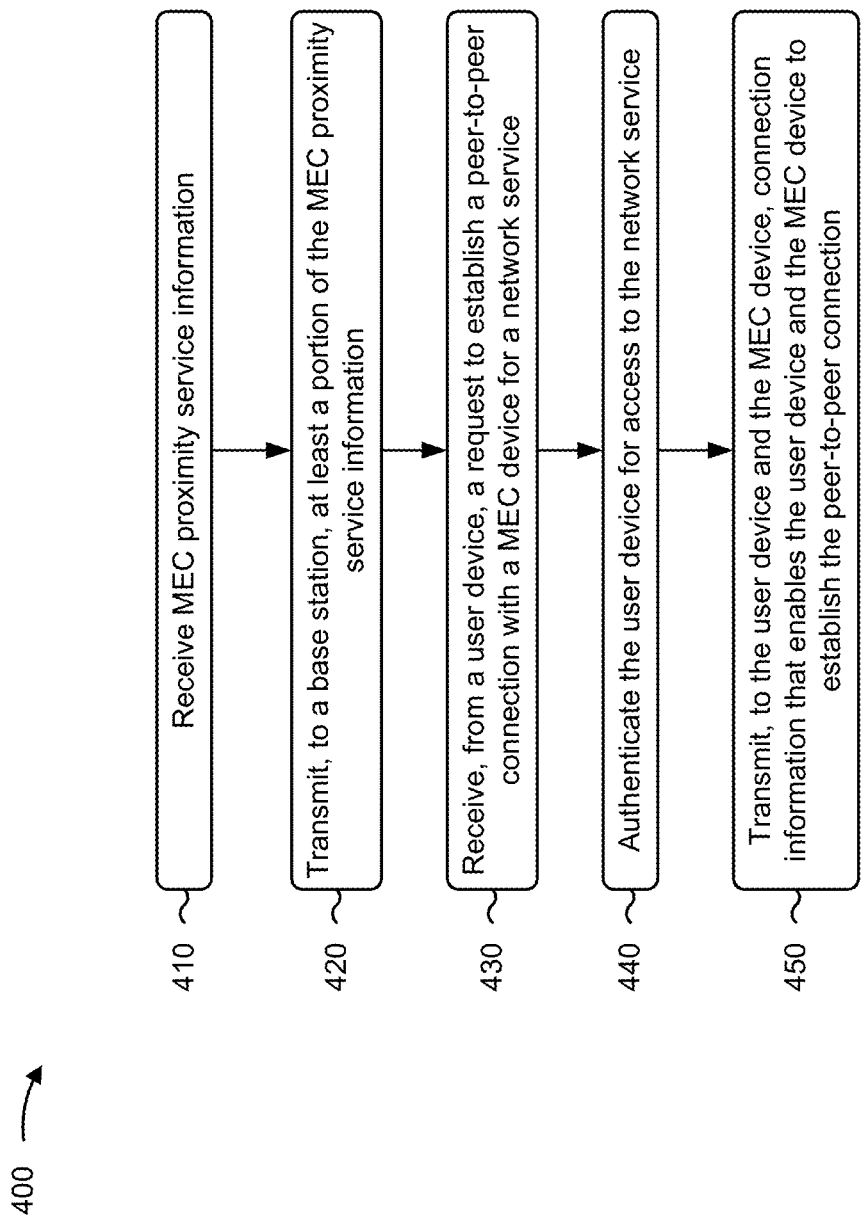

SYSTEMS AND METHODS FOR NETWORK-ENABLED PEER-TO-PEER COMMUNICATION USING MULTI-ACCESS EDGE COMPUTING

RELATED APPLICATION

This application is a continuation of U.S. patent application Ser. No. 16/689,751, entitled "SYSTEMS AND METHODS FOR NETWORK-ENABLED PEER-TO-PEER COMMUNICATION USING MULTI-ACCESS EDGE COMPUTING," filed Nov. 20, 2019 (now U.S. Pat. No. 11,026,279), which is incorporated herein by reference in its entirety.

BACKGROUND

Multi-access edge computing (MEC) is a network architecture of MEC resources (e.g., devices, applications operating on devices, and/or the like) that may operate at an edge of a cellular network. The MEC resources may perform operations of the cellular network for connected user devices that are within a coverage area of the MEC resources.

BRIEF DESCRIPTION OF THE DRAWINGS

FIG. 4 is a flow chart of an example process for network-enabled peer-to-peer communication using multi-access edge computing.

DETAILED DESCRIPTION OF PREFERRED EMBODIMENTS

Figure 1A:
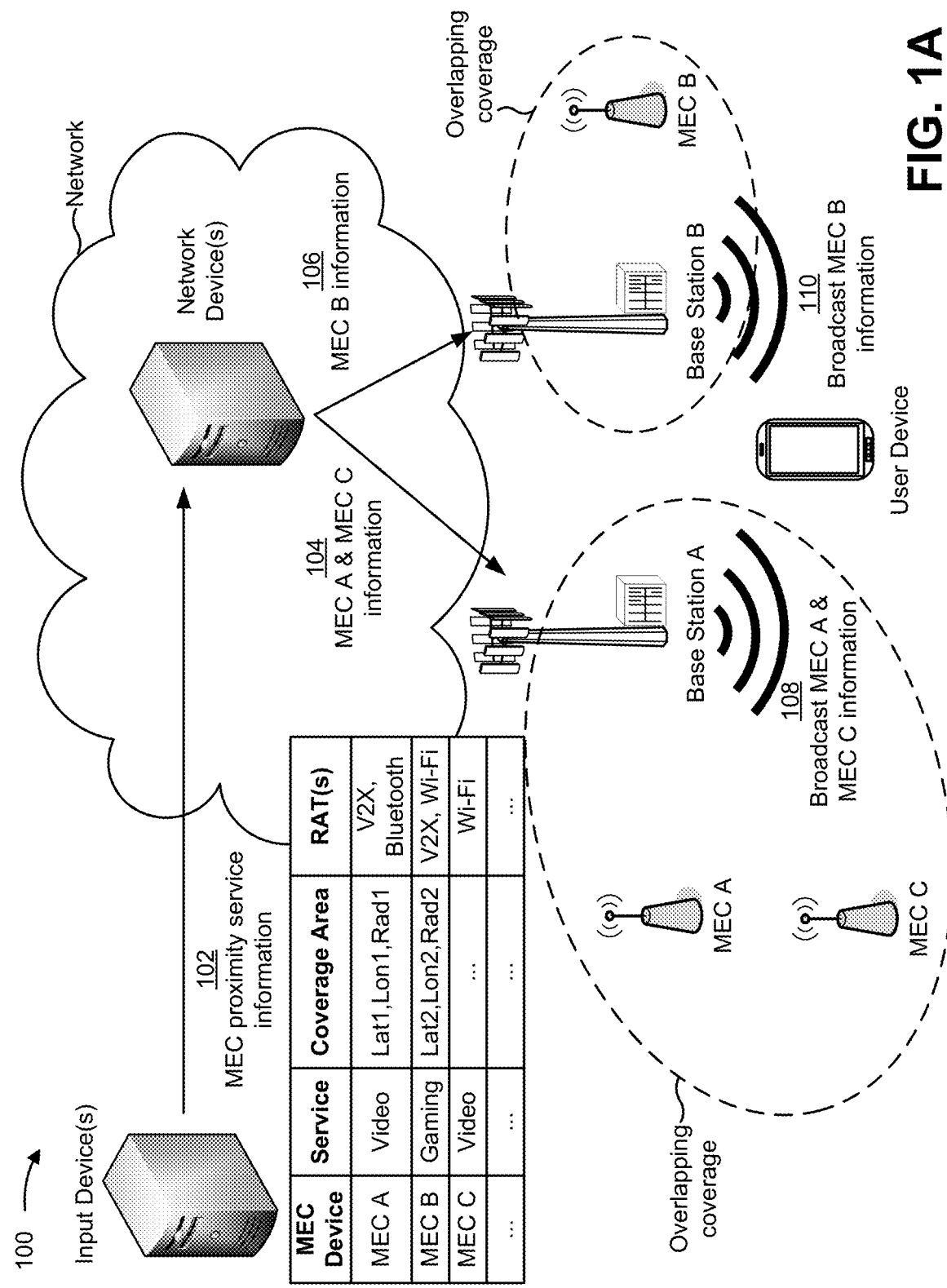
FIGS. 1A-1C are diagrams of an implementation described herein.

The following detailed description of example implementations refers to the accompanying drawings. The same reference numbers in different drawings may identify the same or similar elements.

Multi-access edge computing (MEC) may provide benefits to a cellular network and to user devices that are connected to the cellular network. A user device may communicate with a MEC device hosting a service to reduce latency of communications for the service. Additionally, communicating with the MEC device may reduce an amount of communication via a core network or radio access network of the cellular network, thereby offloading resource consumption and increasing spectral efficiency. In some cases, different MEC devices may be configured and/or equipped with hardware or software to handle a variety of different service requests, such as video streaming services, image processing, gaming, printing, file storage, services associated with different quality of service requirements, and/or the like. In these cases, a user device can access any MEC device (e.g., a closest MEC device) to access a service needed by the user device. However, equipping all MEC devices with the hardware and software needed to support a variety of services may be expensive, duplicative, wasteful, and often infeasible. Furthermore, resources of these MEC devices and/or bandwidth for communicating with these MEC devices may be consumed by resource-intensive or bandwidth-intensive services, which may increase latency for other services.

To mitigate these and other issues, different MEC devices may be equipped to support different types of services, and not all MEC devices may be capable of supporting all services. This may reduce a cost of deployment of MEC devices in a network, and may lead to lower latency, more efficient resource allocation, and increased spectral efficiency across a variety of services. However, when different MEC devices support different services, a user device may need to be informed of the types of services and other capabilities supported by different MEC devices. Otherwise, the user device may establish a connection with a MEC device (e.g., a closest MEC device) that does not support a service required by the user device. Some systems and methods described herein enable network-assisted peer-to-peer communication between a user device and a MEC device. The network may inform a user device about available MEC devices, services supported by those MEC devices, capabilities of those MEC devices, and/or the like. In this way, a user device may connect to a MEC device that supports a service required by the user device. Furthermore, latency for the service may be reduced and quality of experience may be improved (e.g., by reducing a number of failed service requests and providing the service via a MEC device that is closer to the user than core network devices), spectral efficiency may be improved (e.g., by offloading communications from a licensed spectrum), and resources may be efficiently allocated (e.g., via specialized MEC devices tailored to specific services).

Figure 1B:
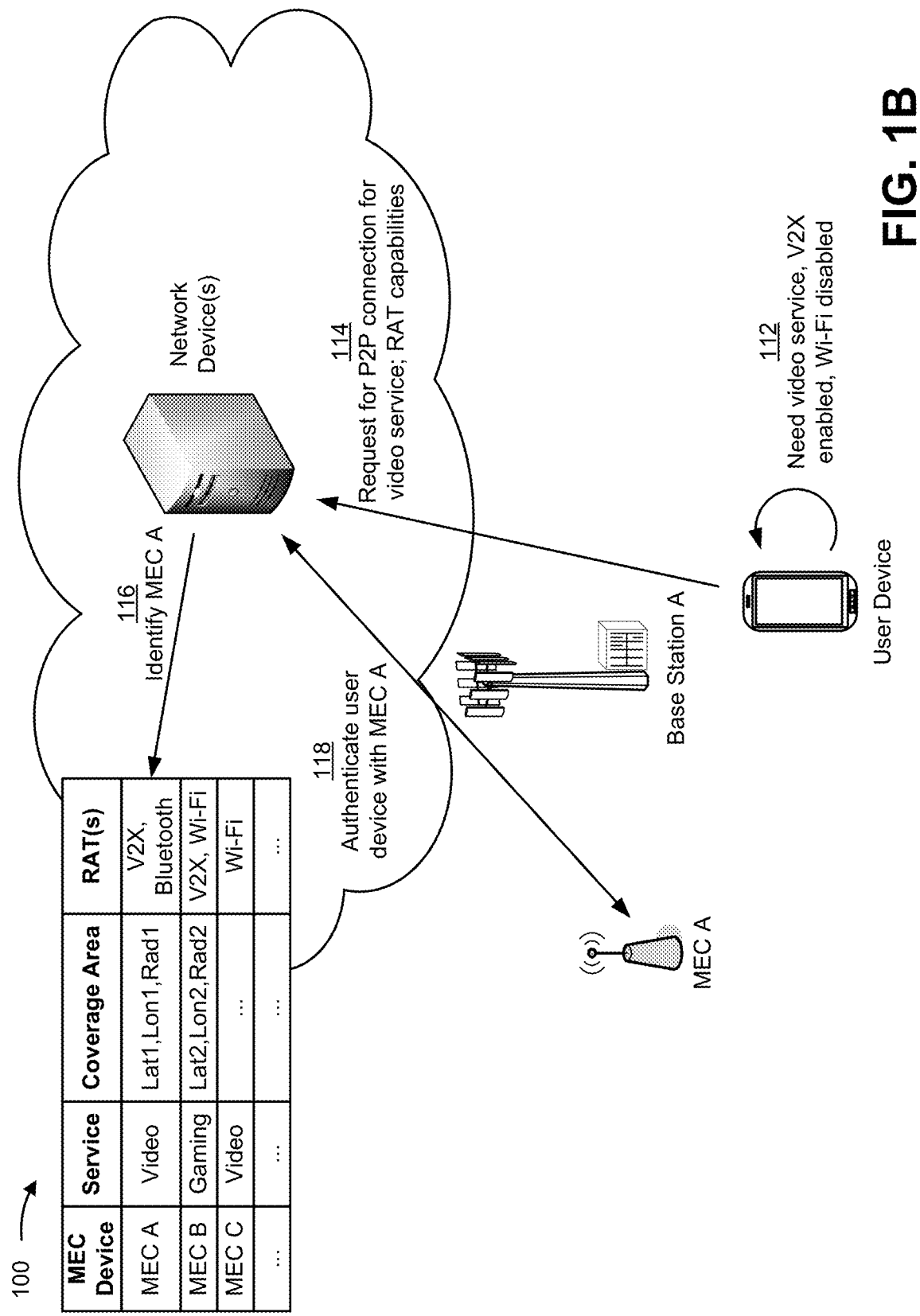
Figure 1C:
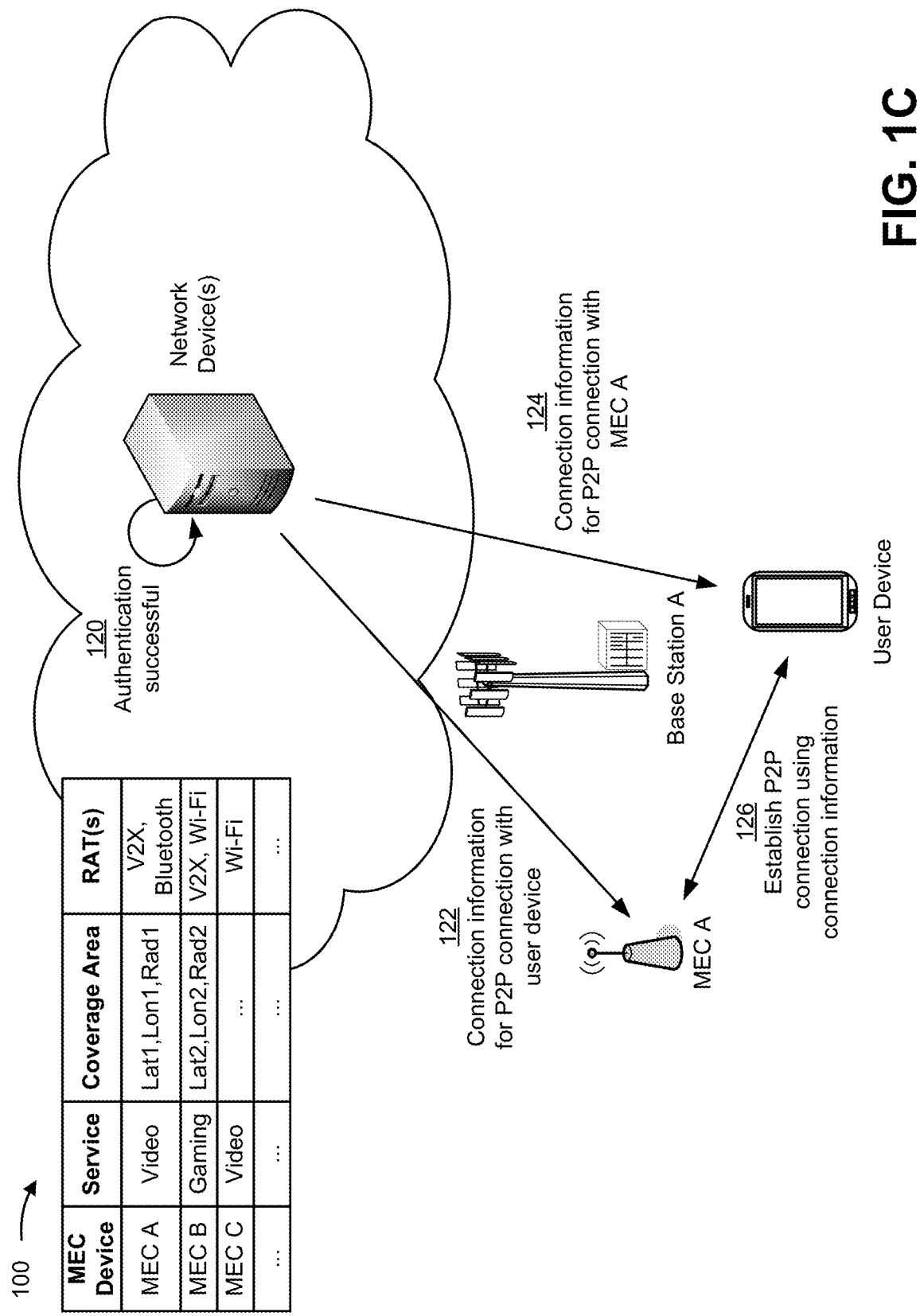

FIGS. 1A-1C are diagrams of an example implementation 100 described herein. As shown in FIG. 1A, and by reference number 102, one or more input devices (e.g., a server, a computer, a terminal, and/or the like) may transmit MEC proximity service information to a network device (e.g., a server) within a network (e.g., a core network). In some implementations, a network operator (e.g., an operator of a core network, a MEC network, and/or the like) may input the MEC proximity service information using an input device, and the input device may transmit the MEC proximity service information to the network device. Additionally, or alternatively, a MEC device may transmit MEC proximity service information, for the MEC device, to the input device and/or the network device upon being deployed, such as in a self-organizing network. The network device may store the MEC proximity service information in memory for later use, as described in more detail below.

The MEC proximity service information may include information that enables the network device to inform user devices about deployed MEC devices to assist with establishing a peer-to-peer (P2P) connection between a user device and a MEC device. As shown, the MEC proximity service information may identify one or more MEC devices that have been deployed, shown as MEC A, MEC B, and MEC C. In some implementations, a MEC device may be identified using a cell identifier for the MEC device, a network address of the MEC device, and/or the like. As further shown, for each MEC device, the MEC proximity service information may indicate a set of (e.g., one or more) services supported by the MEC device, a coverage area of the MEC device (e.g., which may be indicated using a location of the MEC device and a range of the MEC device), a set of radio access technologies (RATs) supported by the MEC device, and/or the like.

In example implementation 100, MEC A supports a video service (e.g., video streaming), MEC B supports a gaming service (e.g., multi-player gaming, virtual reality gaming, augmented reality gaming, and/or the like), and MEC C also supports the video service. These services are used herein as an example, and other services (sometimes referred to herein as network services) may be supported by one or more MEC devices, such as an image processing service (e.g., for vehicle-to-everything (V2X) image processing), a printing service, a file storage service, different services associated with different quality of service requirements (e.g., an ultra reliable low latency communication (URLLC) service, a best efforts service, and/or the like), an audio streaming service, a navigation service, an entertainment service, a telemetry service, a positioning service (e.g., a global positioning system (GPS) service, a real time kinematics (RTK) service, and/or the like), a social media service, a tethered Internet service, a service associated with a particular application (e.g., software application executable on user devices and/or MEC devices), and/or the like. In some implementations, a single MEC device may support multiple services. In some implementations, the set of services supported by a MEC device may depend on hardware included in or connected to the MEC device (e.g., a graphic processing unit (GPU) for image processing, a printer for printing, a GPS unit for position determination, a hard drive for file storage, and/or the like), software installed on the MEC device (e.g., an application for providing a particular service), a quantity of resources associated with the MEC device (e.g., an amount of storage space, a number of antennas of the MEC device, and/or the like), a capability of the MEC device, and/or the like.

In example implementation 100, a coverage area for a MEC device is indicated in the MEC proximity service information using a latitude of the MEC device (shown as Lat1 and Lat2, for MEC A and MEC B, respectively), a longitude of the MEC device (shown as Lon1 and Lon2), and a communication range of the MEC device (e.g., a radius of communication, shown as Rad1 and Rad2). In some implementations, the coverage area may be indicated using fewer parameters, additional parameters, and/or different parameters, such as an elevation of the MEC device, geographic coordinates of the MEC device (e.g., GPS coordinates), a set of boundary points of the coverage area, a maximum transmit power of the MEC device, and/or the like. In some implementations, multiple coverage areas may be indicated for a MEC device, and each coverage area may correspond to a different RAT supported by the MEC device.

In example implementation 100, MEC A supports a V2X RAT and a Bluetooth RAT, MEC B supports a V2X RAT and a Wi-Fi RAT, and MEC C supports a Wi-Fi RAT. These RAT types are used herein as an example, and other RAT types may be supported by one or more MEC devices, such as another type of wireless local area network (WLAN) (e.g., other than Wi-Fi), another type of wireless personal area network (WPAN) (e.g., other than Bluetooth), and/or the like. In some implementations, the RAT types supported by the MEC device may be RAT types other than a RAT that uses licensed spectrum, thereby increasing network utilization and improving spectral efficiency by offloading communications from the licensed spectrum.

In some implementations, a MEC device may register with the network device to provide a service. For example, after being deployed, the MEC device may establish a connection with a base station or another network access point, and may request to register to provide the service. In some implementations, the network device may authenticate the MEC device, such as by verifying a credential of the MEC device (e.g., such as a MEC device identifier, a username, a password, a token, a certificate, a security key, and/or the like). After or as part of authentication, the MEC device may transmit MEC proximity service information, for the MEC device, to the network device. Upon successful authentication, the network device may store the MEC proximity service information for the authenticated MEC device.

The network device may identify a set of MECs devices, indicated in MEC proximity service information, that have overlapping coverage with a base station, and may transmit MEC proximity service information for those MECs to the base station (e.g., may transmit a relevant portion of the overall MEC proximity service information). In some implementations, the network device may receive (e.g., from a base station) and/or may store information that indicates a coverage area of a base station, in a similar manner as described above regarding information that identifies a coverage area of a MEC device. The network device may compare a base station coverage area to MEC coverage areas to identify a set of MEC devices that have overlapping coverage with the base station (e.g., where a portion or the entirety of the coverage area of a MEC device overlaps with the coverage area of the base station). The network device may transmit, to the base station, MEC proximity service information for the set of MEC devices that have overlapping coverage with the base station.

For example, as shown in FIG. 1A, MEC A and MEC C may have overlapping coverage with a first base station, shown as Base Station A, and MEC B may have overlapping coverage with a second base station, shown as Base Station B. In this case, as shown by reference number 104, the network device may transmit MEC proximity service information (e.g., a MEC device identifier, a service identifier, a coverage area identifier, a RAT identifier, and/or the like) for MEC A and MEC C to Base Station A. Similarly, as shown by reference number 106, the network device may transmit MEC proximity service information for MEC B to Base Station B. In some implementations, a MEC device may have overlapping coverage with multiple base stations, and/or a base station may have overlapping coverage with multiple MEC devices. In some implementations, the network device may update MEC proximity service information stored by the network device to indicate a set of base stations associated with each MEC device (e.g., a set of base stations having overlapping coverage with the MEC device).

After receiving the MEC proximity service information (e.g., relevant to the base station), the base station may broadcast the MEC proximity service information. For example, the base station may transmit the MEC proximity service information in system information (e.g., in a short message, an emergency alert system (EAS) message, and/or the like), via a physical broadcast channel, and/or the like. As shown by reference number 108, in example implementation 100, Base Station A broadcasts MEC proximity service information for MEC A and MEC C. Similarly, Base Station B broadcasts MEC proximity service information for MEC B. A user device may receive MEC proximity service information broadcast by one or more base stations, such as Base Station A (e.g., a serving base station of the user device) and Base Station B (e.g., a neighbor base station of the user device).

In some implementations, the MEC proximity service information broadcast by a base station may include MEC device identifiers (which may include, for example, index values) for MEC devices and corresponding services supported by the MEC devices. In this case, the user device may request additional MEC proximity service information for MEC devices that provide a service requested by the user device, such as in a request for the service, as described below in connection with FIG. 1B. Upon receiving the request for the service, the network device may provide additional MEC proximity service information for the indicated MEC devices (e.g., MEC devices that support the requested service), such as respective sets of RATs supported by each MEC device, respective locations of each MEC device, respective coverage areas of each MEC device, and/or the like. In this way, overhead associated with broadcasting MEC proximity service information may be reduced.

As shown in FIG. 1B, and by reference number 112, the user device may determine a service to be used by the user device, for which a MEC connection (e.g., a P2P connection between the user device and the MEC device) may be utilized. In example implementation 100, the user device identifies a need for a video service. In some implementations, the user device may determine one or more RATs via which the user device is capable of communicating. In example implementation 100, V2X communication is supported and/or enabled for the user device, and Wi-Fi is unsupported or disabled for the user device.

As shown by reference number 114, the user device may transmit, to the network device (e.g., via a serving base station of the user device), a request to establish a P2P connection with a MEC device for the service identified by the user device. In example implementation 100, the user device may request a P2P connection with a MEC device for the video service. In some implementations, the user device may indicate one or more RATs via which the user device is capable of communicating. In example implementation 100, the user device indicates (e.g., in the request) that the user device is capable of communicating using a V2X RAT, and is not capable of communicating using a Wi-Fi RAT. In some implementations, the request may include a user device identifier of the user device (e.g., a non-access stratum (NAS) identifier, a radio access network (RAN) identifier, an international mobile subscriber identity (IMSI), and/or the like), an application associated with the requested service, and/or the like.

As shown by reference number 116, the network device may identify a MEC device capable of supporting the request (e.g., capable of providing the requested service). In some implementations, the network device may identify the MEC device using MEC proximity service information stored in memory of the network device. For example, the network device may identify a base station via which the request is received (e.g., Base Station A), may identify a set of MEC devices associated with the base station, and may identify a MEC device, capable of supporting the request, from the set of MEC devices associated with the base station. In some implementations, the user device may indicate, in the request, one or more base stations (e.g., using one or more cell identifiers) satisfying a connectivity parameter (e.g., for which the user device detects a threshold signal strength). The network device may identify a set of MEC devices associated with the one or more base stations, and may identify a MEC device, capable of supporting the request, from the set of MEC devices associated with the one or more base stations. The one or more base stations may include, for example, a serving base station of the user device and one or more neighbor base stations of the user device. Additionally, or alternatively, the user device may transmit, to the network device, MEC proximity service information received by the user device in one or more broadcast messages (e.g., from one or more base stations). In this case, the network device may identify a MEC device, capable of providing the requested service, from the MEC proximity information received from the user device.

The network device may identify a MEC device capable of providing the requested service by comparing the service indicated in the request from the user device and services supported by each MEC device in the relevant MEC proximity service information. If a single MEC device is capable of providing the service, then the network device may select that MEC device. If no MEC devices are capable of providing the service, then the network device may inform the user device, and the user device may receive the service from the core network. If multiple MEC devices are capable of providing the service, then the network device may identify a MEC device using one or more other parameters included in the MEC proximity service information, such as a RAT type, a coverage area, and/or the like.

For example, the network device may identify a MEC device that supports a RAT type indicated in the request as being supported and/or enabled by the user device. If a single MEC device supports a RAT supported by the user device (and is capable of providing the service), then the network device may select that MEC device. If no MEC devices capable of providing the service support the RAT, then the network device may inform the user device and/or may request the user device to enable a different RAT (e.g., a Wi-Fi RAT, in example implementation 100). If multiple MEC devices capable of providing the service support the RAT, then the network device may identify a MEC device using one or more other parameters included in the MEC proximity service information, such as a coverage area. For example, the network device may select a MEC device that is closest to the user device. To support this selection, the user device may indicate a location of the user device in the request.

In some implementations, rather than the network device identifying the MEC device, the user device may identify the MEC device using the MEC proximity service information received by the user device in a similar manner as described above. In this case, the user device may indicate a requested MEC device (or a set of requested MEC devices) to the network device, such as by using a MEC identifier of the MEC device, a network address of the MEC device (e.g., an Internet Protocol address), a cell identifier of the MEC device, and/or the like. If the user device indicates a set of MEC devices, then the network device may select a MEC device, from the set of MEC devices, for the P2P connection. Additionally, or alternatively, the network device may indicate multiple MEC devices to the user device, such as multiple MEC devices capable of providing the requested service, multiple MEC devices with a coverage area that includes a location of the user device, multiple MEC devices that support a RAT type indicated by the user device, and/or the like. The user device may select a MEC device, from the multiple MEC devices, for the P2P connection (e.g., based on a set of RATs supported by the MEC device, a coverage area of the MEC device, a location of the MEC device, and/or the like). In this case, the user device may indicate the selected MEC device to the network device (e.g., in an additional request). In some implementations, the network device may indicate the multiple MEC devices along with additional MEC proximity service information for the MEC devices (e.g., which may not be broadcast by the base station), such as supported RATs, coverage areas, and/or the like.

As shown by reference number 118, the network device may authenticate the user device for access to the service.

The authentication may include authenticating that the user device is permitted to access the service (e.g., is subscribed to the service, has a valid credential for the service, and/or the like) and/or is permitted to communicate with the MEC device (e.g., has a subscription to communicate with the MEC device, has a certificate or other credential for communicating with the MEC device, and/or the like). For example, the network device may authenticate the user device by verifying a credential of the user device, such as a user device identifier, a username, a password, a license identifier, a token, a certificate, a security key, and/or the like. In some implementations, the credential may be included in the request. In some implementations, the network device may verify the credential using a data structure stored by the network device or another core network device (e.g., an authentication server function (AUSF) entity). Additionally, or alternatively, the network device may verify the credential by communicating with the MEC device, as shown in FIG. 1B. For example, the network device may transmit a credential associated with the user device (e.g., received in the request, stored by an AUSF entity, and/or the like) to the MEC device. The MEC device may verify the credential using a data structure stored by the MEC device, and may transmit an authentication result (e.g., success or failure, accept or reject, approve or deny, and/or the like) to the network device.

As shown in FIG. 1C, and by reference number 120, in example implementation 100, the authentication of the user device for access to the service is successful. If the authentication is unsuccessful, then the network device may attempt to authenticate the user device with a different MEC device, may inform the user device of the unsuccessful authentication, may refrain from providing connection information (described below) to the user device, and/or the like.

As shown by reference number 122, based on successful authentication, the network device may provide connection information to the MEC device to enable the MEC device to establish a P2P connection with the user device. The connection information transmitted to the MEC device may indicate a device identifier of the user device, a service requested by the user device, a location of the user device, one or more RAT types supported by the user device, a RAT type to be used for the P2P connection, a communication protocol to be used for the P2P connection, a frequency band to be used for the P2P connection, a component carrier to be used for the P2P connection, a MEC device credential to be used to verify the MEC when establishing the connection, and/or the like. In some implementations, the connection information transmitted to the MEC device may include the request from the user device, which may be relayed as is or may be supplemented with additional information by the network device.

Additionally, or alternatively, as shown by reference number 124, the network device may provide connection information to the user device to enable the user device to establish a P2P connection with the MEC device. The connection information transmitted to the user device may indicate a device identifier of the MEC device (e.g., a cell identifier, a network address, a domain name system identifier of the MEC device, and/or the like), a location of the MEC device, one or more RAT types supported by the MEC device, a RAT type to be used for the P2P connection, a communication protocol to be used for the P2P connection, a frequency band to be used for the P2P connection, a component carrier to be used for the P2P connection, a user device credential to be used to verify the user device when establishing the connection, and/or the like.

As shown by reference number 126, the user device and the MEC device may establish a P2P connection using the connection information received from the network device. In some implementations, the user device and the MEC device may establish the P2P connection using a predetermined and/or preconfigured RAT and/or protocol. Alternatively, the user device and the MEC device may establish the P2P connection using a particular RAT and/or a particular protocol indicated in the connection information. Additionally, or alternatively, the user device and the MEC device may establish the P2P connection using one or more other connection parameters indicated in the connection information, such as a frequency band to be used for the P2P connection, a component carrier to be used for the P2P connection, and/or the like. Additionally, or alternatively, the user device and the MEC device may exchange one or more credentials (e.g., a user device credential, a MEC device credential, and/or the like), indicated in the connection information, to authenticate one another as part of establishing the connection.

By assisting a user device in selecting a MEC device for a service, the network device may enable different MEC devices to be equipped to support different types of services, and may enable user devices to use those different MEC devices. This may reduce a cost of deployment of MEC devices in a network, and may lead to lower latency, more efficient resource allocation, and increased spectral efficiency across a variety of services. Furthermore, by notifying user devices of the MEC proximity service information, the network device may prevent the user device from establishing a connection with a MEC device (e.g., a closest MEC device or a default MEC device) that does not support a service required by the user device, thereby conserving network resources and device resources that would be wasted by establishing such as connection. In this way, latency for the service may be reduced and quality of experience may be improved (e.g., by reducing a number of failed service requests and providing the service via a MEC device that is closer to the user than core network devices), spectral efficiency may be improved (e.g., by offloading communications from a licensed spectrum), and resources may be efficiently allocated (e.g., via specialized MEC devices tailored to specific services).

As indicated above, FIGS. 1A-1C are provided as examples. Other examples can differ from what is described with regard to FIGS. 1A-1C. The number and arrangement of devices and networks shown in FIGS. 1A-1C are provided as one or more examples. In practice, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of FIGS. 1A-1C may perform one or more functions described as being performed by another set of devices of FIGS. 1A-1C.

Figure 2:
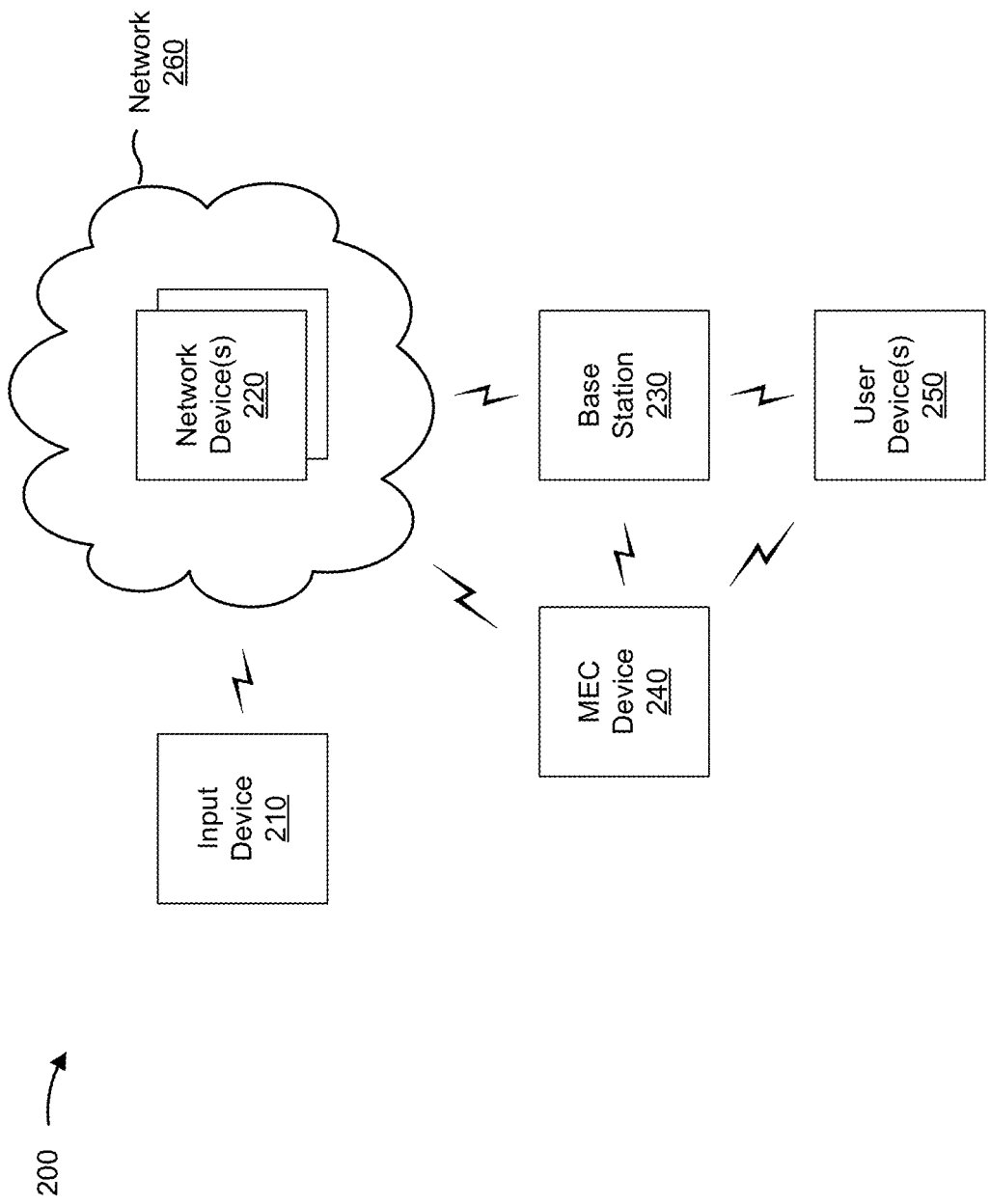
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an input device 210, one or more network devices 220, a base station 230, a MEC device 240, a user device 250, and a network 260. Devices of environment 200 may interconnect via wired connections, wireless connections, or a combination of wired and wireless connections.

Input device 210 includes one or more devices capable of receiving input (e.g., MEC proximity service information) and transmitting the input to network device 220. For example, input device 210 may include a computer (e.g., a desktop computer, a laptop computer, and/or the like), a mobile device (e.g., a smart phone and/or the like), a user terminal, a server, and/or the like. Input device 210 may be used to provide MEC proximity service information to network device 220, as described elsewhere herein.

Network device 220 includes one or more devices associated with a core network and/or a radio access network. For example, network device 220 may include a server, an application server, an application function (AF) entity, an access and mobility management function (AMF) entity, an authentication server function (AUSF) entity, a policy control function (PCF) entity, a base station, and/or the like. Network device 220 may assist with establishing a P2P connection between a user device 250 and a MEC device 240, as described elsewhere herein.

Base station 230 includes one or more devices capable of communicating with user devices 250 and/or MEC devices 240 using a cellular RAT. For example, base station 230 may include a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 230 may transfer traffic between user device 250 (e.g., using a cellular RAT), other base stations 230 (e.g., using a wireless interface or a backhaul interface, such as a wired backhaul interface), and/or network 260 (e.g., network device 220). Base station 230 may provide one or more cells that cover geographic areas. Some base stations 230 may be mobile base stations. Some base stations 230 may be capable of communicating using multiple RATs.

In some implementations, base station 230 may perform scheduling and/or resource management for user devices 250 within a coverage area of base station 230 (e.g., user devices 250 covered by a cell provided by base station 230). In some implementations, base stations 230 may be controlled or coordinated by a network controller (e.g., network device 220), which may perform load balancing, network-level configuration, and/or the like. The network controller may communicate with base stations 230 via a wireless or wireline backhaul. In some implementations, base station 230 may include a network controller, a self-organizing network (SON) module or component, or a similar module or component. In other words, a base station 230 may perform network control, scheduling, and/or network management functions (e.g., for other base stations 230 and/or for uplink, downlink, and/or sidelink communications of user devices 250 covered by the base station 230). In some implementations, base station 230 may include a central unit and multiple distributed units. The central unit may coordinate access control and communication with regard to the multiple distributed units. The multiple distributed units may provide user devices 250 and/or other base stations 230 with access to network 260.

MEC device 240 includes one or more devices capable of communicating with a user device 250 via a P2P connection (e.g., using a V2X protocol, a WLAN connection, a WPAN connection, and/or the like). In some implementations, MEC device 240 is a base station 230. Additionally, or alternatively, MEC device 240 may include a network access point, a network gateway, a firewall, a server, a security device, a device implementing a virtual machine, a cloud computing resource, and/or the like.

User device 250 includes one or more devices capable of wireless communication (e.g., via a base station 230 and via a P2P connection). For example, user device 250 may include a communication and/or computing device, such as a mobile phone (e.g., a smart phone, a radiotelephone, and/or the like), a laptop computer, a tablet computer, a handheld computer, one a gaming device, a wearable communication device (e.g., a smart wristwatch, a pair of smart eyeglasses, and/or the like), a user device in a vehicle, a user device in a bicycle, or a similar type of device. In some implementations, user device 250 may be a user equipment as defined by the $3^{rd}$ Generation Partnership Project (3GPP).

Network 260 includes one or more wired and/or wireless networks. For example, network 260 may include a core network, a cellular network (e.g., a long-term evolution (LTE) network, a code division multiple access (CDMA) network, a 3G network, a 4G network, a 5G network, another type of next generation network, and/or the like), a wireless wide area network (WWAN), a public land mobile network (PLMN), a local area network (LAN), a telephone network, a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
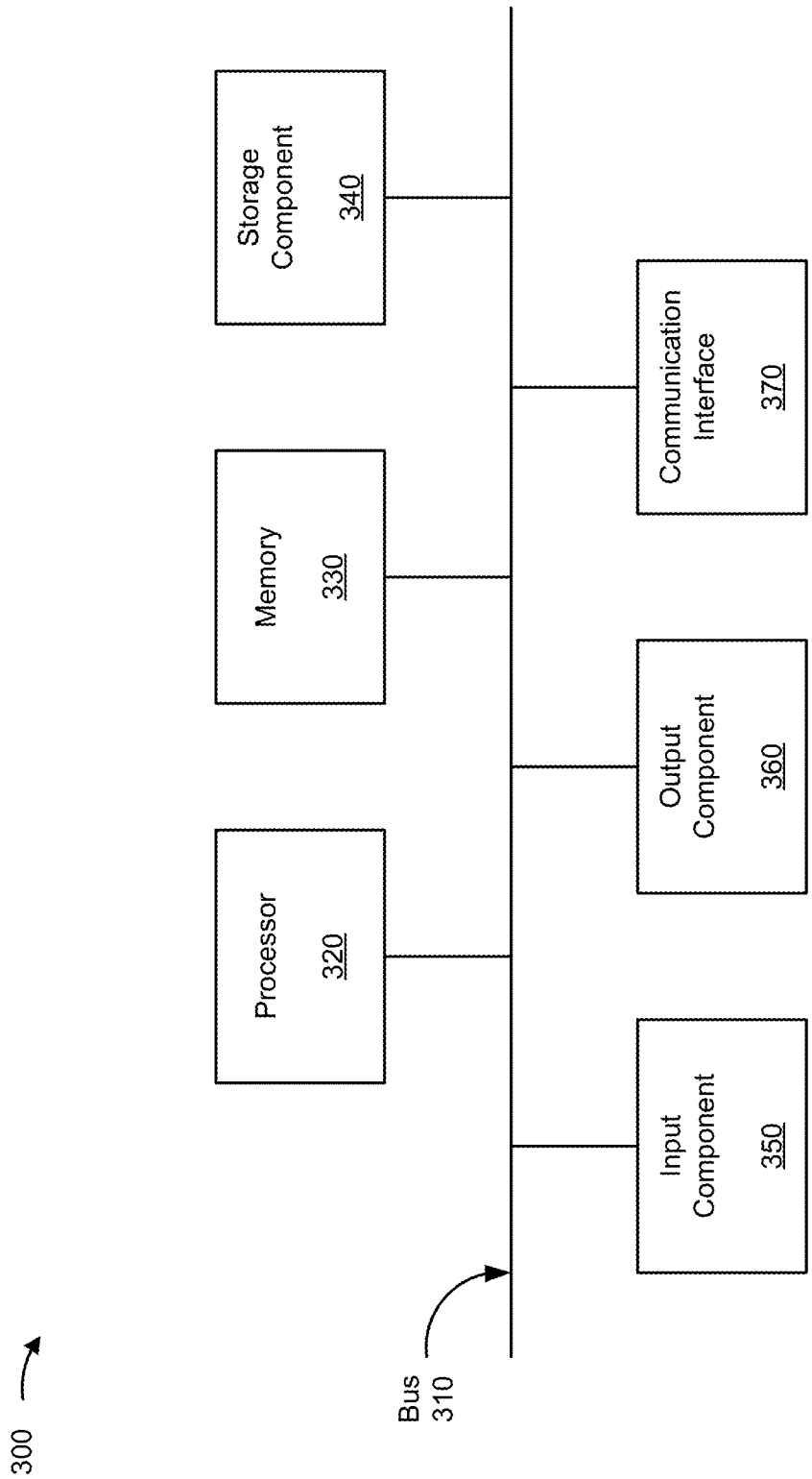
FIG. 3 is a diagram of example components of one or more devices of FIG. 2.

FIG. 3 is a diagram of example components of a device 300. Device 300 may correspond to input device 210, network device 220, base station 230, MEC device 240, user device 250, and/or the like. In some implementations, input device 210, network device 220, base station 230, MEC device 240, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for network-enabled peer-to-peer communication using multi-access edge computing (MEC). In some implementations, one or more process blocks of FIG. 4 may be performed by a network device (e.g., network device 220). In some implementations, one or more process blocks of FIG. 4 may be performed by another device or a group of devices separate from or including the network device, such as a base station (e.g., base station 230), a MEC device (e.g., MEC device 240), a user device (e.g., user device 250), and/or the like.

As shown in FIG. 4, process 400 may include receiving MEC proximity service information (block 410). For example, the network device (e.g., using processor 320, memory 330, storage component 340, input component 350, output component 360, communication interface 370 and/or the like) may receive MEC proximity service information. In some implementations, the MEC proximity service information may identify a set of MEC devices and a set of network services supported by respective MEC devices of the set of MEC devices, as described above. Additionally, or alternatively, the MEC proximity service information may include information that identifies a plurality of MEC devices, a set of network services supported by each MEC device of the plurality of MEC devices, and a respective coverage area associated with each MEC device of the plurality of MEC devices. In some implementations, the MEC proximity service information further identifies one or more RAT types supported by the MEC device.

As further shown in FIG. 4, process 400 may include transmitting, to a base station, at least a portion of the MEC proximity service information (block 420). For example, the network device (e.g., using processor 320, memory 330, storage component 340, input component 350, output component 360, communication interface 370 and/or the like) may transmit, to a base station, at least a portion of the MEC proximity service information (e.g., for broadcasting by the base station), as described above. In some implementations, process 400 includes identifying the base station based on a coverage area of the base station and a coverage area of the MEC device, and transmitting at least the portion of the MEC proximity service information to the base station based on identifying the base station. The portion of the MEC proximity service information may include information associated with a set of MEC devices, of the plurality of MEC devices, within a coverage area of the base station.

As further shown in FIG. 4, process 400 may include receiving, from a user device, a request to establish a peer-to-peer connection with a MEC device for a network service (block 430). For example, the network device (e.g., using processor 320, memory 330, storage component 340, input component 350, output component 360, communication interface 370 and/or the like) may receive, from a user device, a request to establish a peer-to-peer connection with a MEC device for the network service, as described above.

As further shown in FIG. 4, process 400 may include authenticating the user device for access to the network service (block 440). For example, the network device (e.g., using processor 320, memory 330, storage component 340, input component 350, output component 360, communication interface 370 and/or the like) may authenticate the user device for access to the network service, as described above. In some implementations, process 400 includes receiving, from the user device, an indication of a credential associated with the user device, and authenticating the user device based on the credential. For example, process 400 may include transmitting the credential to the MEC device, and receiving, from the MEC device, an indication that the credential is valid.

As further shown in FIG. 4, process 400 may include transmitting, to the user device and the MEC device, connection information that enables the user device and the MEC device to establish the peer-to-peer connection (block 450). For example, the network device (e.g., using processor 320, memory 330, storage component 340, input component 350, output component 360, communication interface 370 and/or the like) may transmit, to the user device and the MEC device, connection information that enables the user device and the MEC device to establish the peer-to-peer connection, based on authenticating the user device for access to the network service (e.g., based on authenticating the user device for access to the network service), as described above. In some implementations, the connection information includes a certificate to be transmitted by the user device to the MEC device in association with establishing the peer-to-peer connection. Additionally, or alternatively, the connection information may identify one or more RAT types supported by the MEC device. Additionally, or alternatively, the connection information may instruct the user device to use a particular RAT, of the one or more RATs, to communicate with the MEC device.

In some implementations, process 400 includes receiving, from the user device, information that indicates at least one of a location of the user device or a RAT type supported by the user device; identifying the MEC device based on the information that indicates at least one of the location of the user device or the RAT type supported by the user device; and transmitting the connection information based on identifying the MEC device. In some implementations, process 400 includes transmitting, to the user device and based on the information that indicates at least one of the location of the user device or the RAT type supported by the user device, information that identifies a plurality of MEC devices capable of providing the network service to the user device; and receiving, from the user device, the request to establish the peer-to-peer connection with the MEC device for the network service, wherein the MEC device is selected from the plurality of MEC devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, a request, from a user device and via a base station, to establish a peer-to-peer connection with a multi-access edge computing (MEC) device for a network service supported by the MEC device;
   authenticating, by the network device and based on receiving the request, the user device,
      wherein authenticating the user device is further based on an identification of the MEC device that is based on at least a portion of MEC proximity service information; and
   providing, by the network device and based on authenticating the user device, connection information, to a first one of the MEC device or the user device, to enable the first one of the MEC device or the user device to establish the peer-to-peer connection with a second one of the MEC device or the user device.

2. The method of claim 1, further comprising:
   receiving, by the network device and from an input device, the MEC proximity service information.

3. The method of claim 1, wherein the MEC proximity service information includes one or more of:
- information indicating a set of services, including the network service, supported by the MEC device,
- information indicating a coverage area associated with the MEC device, or
- information indicating a set of radio access technologies (RATs) supported by the MEC device.

4. The method of claim 1, wherein the MEC proximity service information includes a first coverage area associated with the MEC device, and wherein the base station has a second coverage area that overlaps with the first coverage area.

5. The method of claim 1, further comprising:
- authenticating the MEC device,
  - wherein receiving the MEC proximity service information is based on authenticating the MEC device.

6. The method of claim 1, further comprising:
- identifying, based on receiving the MEC proximity service information, a set of MEC devices, including the MEC device, that have overlapping coverage with the base station; and
- transmitting, by the network device and based on identifying the set of MEC devices, the portion of the MEC proximity service information to the base station,
  - wherein the portion of the MEC proximity service information is associated with the set of MEC devices, and
  - wherein receiving the request is based on transmitting the portion of the MEC proximity service information.

7. The method of claim 1, further comprising:
- receiving, based on a request from the user device and via the base station, additional MEC proximity service information; and
- sending, to the base station, the additional MEC proximity service information,
  - wherein the additional MEC proximity service information is at least a second portion of the MEC proximity service information, and
  - wherein receiving the request is based on sending the additional MEC proximity service information.

8. The method of claim 1, further comprising:
- identifying, based on receiving the request, a set of MEC devices, including the MEC device, for providing the network service,
  - wherein authenticating the network device is further based on identifying the network device.

9. The method of claim 8, wherein the set of MEC devices includes a plurality of MEC devices that includes the MEC device, the method further comprising:
- identifying, based on identifying the set of MEC devices, the MEC device,
  - wherein identifying the MEC device is further based on one or more parameters included in the MEC proximity service information.

10. The method of claim 1, wherein the connection information includes one or more of:
- information indicating a device identifier associated with the user device,
- information indicating the network service requested by the user device,
- information indicating a location of the user device,
- information indicating one or more radio access technology (RAT) types supported by the user device,
- information indicating a RAT type to be used for the peer-to-peer connection,
- information indicating a communication protocol to be used for the peer-to-peer connection,
- information indicating a frequency band to be used for the peer-to-peer connection, or
- information indicating a component carrier to be used for the peer-to-peer connection.

11. A network device, comprising:
- one or more processors, configured to:
  - receive, from a user device and via a base station, a request to establish a peer-to-peer connection with a multi-access edge computing (MEC) device for a network service supported by the MEC device;
  - authenticate, based on receiving the request, the user device,
    - wherein authenticating the user device is further based on an identification of the MEC device capable of supporting the request that is based on at least a portion of MEC proximity service information; and
  - provide, based on authenticating the user device, connection information, to a first one of the MEC device or the user device, to enable the first one to establish the peer-to-peer connection with a second one of the MEC device or the user device.

12. The network device of claim 11, wherein the one or more processors are further configured to:
- identify, based on receiving the request and based on the MEC proximity service information, the MEC device as being capable of supporting the request.

13. The network device of claim 11, wherein the one or more processors are further configured to:
- identify, based on receiving the request, the base station;
- identify, based on identifying the base station, a set of MEC devices, including the MEC device, associated with the base station; and
- identify, based on identifying the set of MEC devices, the MEC device capable of supporting the request.

14. The network device of claim 11, wherein the one or more processors are further configured to:
- receive, from the user device and via the base station, the MEC proximity service information; and
- identify, based on the receiving the MEC proximity service information, the MEC device.

15. The network device of claim 14, wherein the one or more processors, to identify the MEC device, are configured to:
- compare a service indicated in the request to a service supported by a set of MEC devices, including the MEC device, via corresponding MEC proximity service information; and
- identify, based on comparing the service indicated in the request to the service supported by the set of MEC devices, the MEC device from the set of MEC devices.

16. The network device of claim 11, wherein the one or more processors are further configured to:
- receive, from the user device, the identification of the MEC device.

17. A non-transitory computer-readable medium storing instructions, the instructions comprising:
- one or more instructions that, when executed by one or more processors associated with a network device, cause the one or more processors to:
  - receive multi-access edge computing (MEC) proximity service information;

transmit, based on receiving the MEC proximity service information, the MEC proximity service information to a base station for broadcasting to one or more user devices;

receive, based on sending the MEC proximity service information, a request, from a user device, of the one or more user devices, and via the base station, to establish a peer-to-peer connection with a MEC device for a network service supported by the MEC device;

authenticate, based on receiving the request, the user device,
   wherein authenticating the user device is further based on an identification of the MEC device that is based on at least a portion of MEC proximity service information; and provide, based on authenticating the user device, connection information, to a first one of the MEC device or the user device, to enable the first one to establish the peer-to-peer connection with a second one of the MEC device or the user device.

18. The non-transitory computer-readable medium of claim 17, wherein the identification of the MEC device comprises one or more of:
   a MEC identifier associated with the MEC device,
   a network address associated with the MEC device, or
   a cell identifier associated with the MEC device.

19. The non-transitory computer-readable medium of claim 17, wherein the one or more instructions, that cause the one or more processors to receive the request, cause the one or more processors to:
   receive information that indicates at least one of a location of the user device or a radio access technology (RAT) type supported by the user device; and
   identify, based on receiving the information, the MEC device.

20. The non-transitory computer-readable medium of claim 17, wherein the connection information includes a certificate to be transmitted by the user device to the MEC device in association with establishing the peer-to-peer connection.

\* \* \* \* \*